Sept. 8, 1931.                F. P. RYDER                1,822,375
              METHOD AND APPARATUS FOR SKINNING TOMATOES
                          Filed Sept. 12, 1928
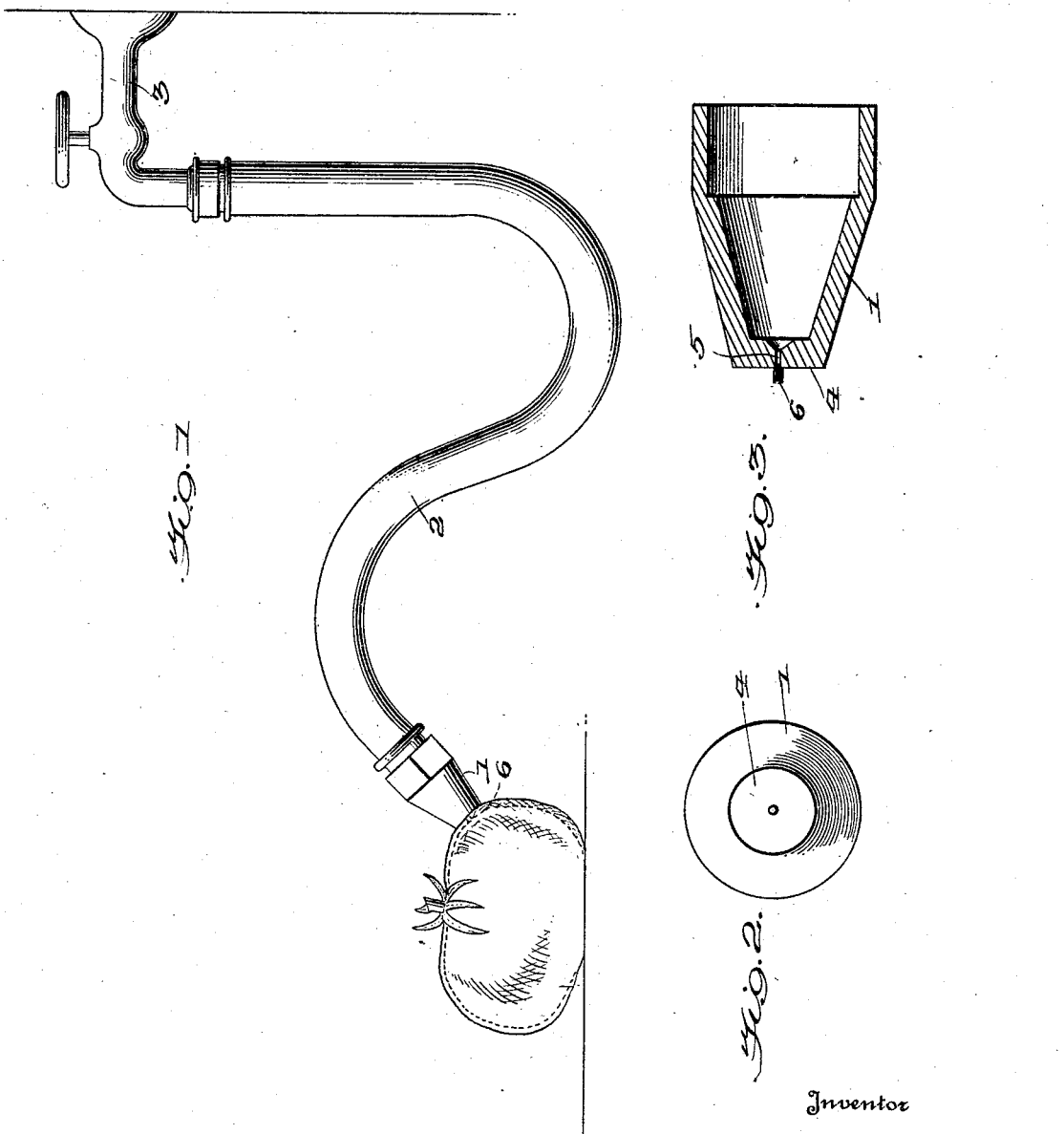
Inventor
Frank Pittis Ryder,
By
Attorney Patented Sept. 8, 1931

1,822,375

UNITED STATES PATENT OFFICE

FRANK P. RYDER, OF NIAGARA FALLS, NEW YORK

METHOD AND APPARATUS FOR SKINNING TOMATOES

Application filed September 12, 1928. Serial No. 305,561.

My invention relates to a method and apparatus for skinning tomatoes.

When tomatoes are to be canned whole it is necessary to remove the skin. At present the skin is loosened by scalding in hot water or steam and removed by hand by the use of small knives. Removing the skin by a paring knife takes off more or less of the pulp and the knife often cuts through the outer wall of the seed chambers. In order to remove the skin with a paring knife it is necessary to grasp the tomatoes hot from the scalding in one hand and use the knife with the other. Because of the wide difference in size and shape of tomatoes and the tendency to great irregularity, paring or peeling machines are unsatisfactory.

My present invention is intended to provide a method and means for separating the skin from tomatoes which will be independent of size or shape and will so separate the skin throughout the surface of the tomato that it may be brushed off or will drop off of itself. A further object of my invention is to provide a method and means for skinning tomatoes without the use of a knife.

With the above explained objects in view my invention consists in the method and apparatus hereinafter described and claimed.

Referring to the drawings:

Figure 1 is a perspective view of a tomato skinning apparatus embodying my invention.

Figure 2 is an end view of the nozzle, and

Figure 3 is a longitudinal sectional view of the same.

In the drawings 1 indicates a nozzle to which fluid pressure is supplied by pipe 2, here shown as a flexible hose, connected at its other end to a faucet 3 to which water or other fluid is supplied under pressure which may be that of municipal water service or may be produced by a pump or other means.

Nozzle 1 terminates in a flat face 4 of substantial diameter with an opening 5 through it communicating with the bore of a short hollow needle 6 which projects a short distance beyond the flat face 4. The bore of the needle is very small, preferably no more than that of a capillary tube.

In the use of my device the needle 6 will be thrust through the outer skin of a tomato until the flat face 4 is in contact or nearly in contact with the skin. The needle 6 is not sufficiently long to pass through the outer shell of the seed chambers and its bore is not sufficiently large to carry a stream of water under pressure of such volume as to force its way into the pulp of the tomato. There will be more or less leakage around the needle 6 but sufficient excess of fluid will enter beneath the outer skin under pressure sufficient to lift it from the body of the tomato for a considerable distance about the point at which the needle is inserted and if the tomato operated on is evenly shaped the fluid will follow about the whole surface. With tomatoes of irregular shape it may be necessary to insert the needle at two or more places.

The face 4 pressed, as shown, against the outer surface of the skin of the tomato will hold the portion of skin from being lifted away by the pressure of the fluid and this causes the fluid to spread in all directions from the area held against lifting action by the face 4, so that the lifting action of the fluid forced in is made effective throughout the surface of the tomato.

The core of the tomato should not be removed until the skin is removed as the cutting of the skin in coring would permit the escape of the fluid.

Having thus described my invention what I claim is:—

1. The method of separating the outer skin of a tomato from the body of a tomato which consists in first scalding the tomato, punching the outer skin and forcing fluid through the puncture between the outer skin and the body of the tomato.

2. The method of skinning tomatoes which consists in loosening the skin of the tomato by scalding, applying a resisting medium to a portion of the outer surface of the skin and forcing fluid through the skin within the area of the resisting medium.

3. The method of skinning tomatoes which consists in forcing fluid through the skin of the tomato between its skin and pulp and interposing a resistance to outward movement of the skin about the point at which the fluid is introduced.

4. The method of skinning tomatoes which consists in first loosening the skin by scalding and then forcing fluid through the skin between it and the pulp and interposing a resistance to the outward movement of the skin about the point at which the fluid is introduced.

5. Apparatus for skinning tomatoes comprising a hollow needle adapted to penetrate the skin of the tomato and means surrounding the hollow needle adapted to bear against the outer surface of the skin about the hollow needle and to resist the outward movement of the skin within its area.

6. Apparatus for skinning tomatoes comprising a nozzle having a hollow needle extending through it and projecting beyond its end, the end of the nozzle surrounding the needle being adapted to bear against the outer face of the skin of the tomato and to determine the penetration of the point of the hollow needle.

In testimony whereof, I hereunto affix my signature.

FRANK P. RYDER.